Aug. 31, 1948.　　C. Y. JONES　　2,448,222
GLOBAL WHEEL
Filed May 26, 1947

C. Y. Jones
INVENTOR

BY　*C. A. Snowbles.*
ATTORNEYS.

Patented Aug. 31, 1948

2,448,222

UNITED STATES PATENT OFFICE 2,448,222

GLOBAL WHEEL

Charles Y. Jones, Carlisle, Pa.

Application May 26, 1947, Serial No. 750,489

2 Claims. (Cl. 301—5)

This invention relates to a wheel of novel construction, of global formation, that is adapted for use either by being mounted upon vehicles for the purpose of use as traction wheels therefor, or of being mounted in association with a drive means for the purpose of driving machinery of various types, in the manner of a pulley.

The primary object of the invention is to provide a wheel of the character described which is capable of use not only in the conventional manner, that is, forward and rearward rotation on its own axis, but which also during rotation, and by application of suitable control means, may be rolled to either side, whereby traction will be exerted unconventionally, in a plane angularly offset to the axis of rotation.

As a result of the formation of a wheel constructed as stated, the rolling thereof is adapted to increase or decrease speed of movement on a vehicle on which the wheel is mounted, and permits accurate guiding of the vehicle when negotiating a curve or the like. Desirable safety protection is as a result furnished.

A further important object of the invention is to provide a wheel, which when mounted upon a vehicle, is adapted to be controlled whereby it will at all times present a tread surface in negotiating curves or sharp corners, whether the surface on which the vehicle is moving is banked or otherwise, this being accomplished without the exertion of unnatural strain upon the tire used upon the wheel, despite the various positions to which the wheel may be moved in being rolled from side to side while forwardly or rearwardly rotated.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing—

Figure 1:
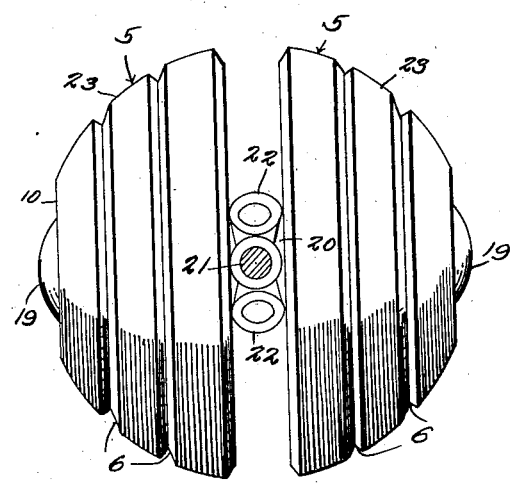
Figure 1 is an elevational view of a wheel constructed in accordance with the invention.
Figure 2:
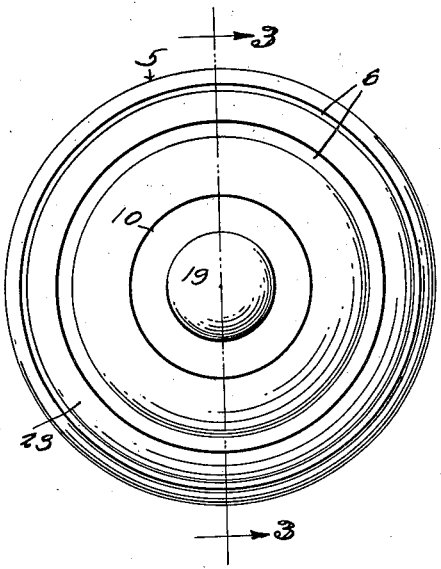
Figure 2 is an elevational view thereof taken from the right of Figure 1.

Referring to the drawing in detail, the reference character 5 designates oppositely disposed, spaced apart outer tire casings embodied in the invention these each being substantially semi-spherical as to their outer conformation, whereby when mounted in spaced relation, the wheel is provided with a global outline.

The outer tire casings 5 are identical in formation, and the tread of each may be formed with annular grooves 6 for the purpose of providing better traction, although, as will be obvious, other types of tread surfaces can well be provided without departure from the spirit of the invention as claimed.

Hereinafter, for the purpose of clarity, the description will be limited to the formation and mounting of one semi-spherical tire 5 only, but it will be understood that the other tire is identically formed, and all details of construction and mounting are duplicated as to the opposite side of the wheel.

The outer tire casing 5 is provided with an inwardly extended annular inner wall 7, which lies in a parallel plane, and is spaced from, the inner wall of the opposed tire. At its inner periphery, the inner wall 7 is recessed as at 8, in order that the tire may be retained within the flange of a hub 9, this reference character designating the hub only generally.

Preferably, the outermost or end portion of the semi-spherical outer tire casing 5 is cut away to provide a flattened circular end portion for a purpose to be described in detail hereinafter, this flattened circular portion being indicated by the reference character 10. The center part of the flat end portion 10 is concavely recessed, as shown at 11. An opening 12 is formed in the center of the concave recess 11, whereby a retaining hub cap, to be described hereinafter, may be attached to the hub 9 for the purpose of effectively retaining the tire thereupon.

Figure 3:
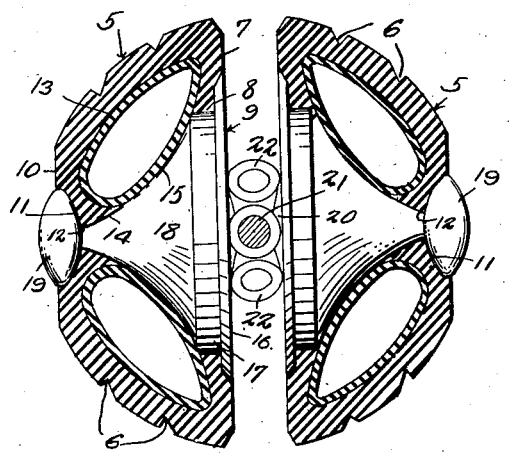
Figure 3 is a sectional view taken on line 3—3 of Figure 2.
Figure 4:
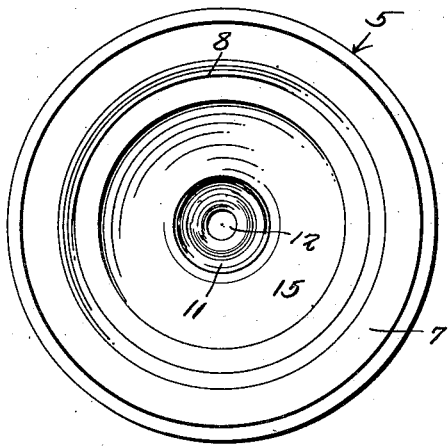
Figure 4 is an elevational view showing the inside of one of two semi-spherical tires embodied in the invention, a hub on which said tire is mountable not being shown.

For the purpose of permitting inflation of the tire, the outer tire casing 5 is provided with an annular recess 13 disposed between the flattened end portion 10 and the inner wall 7, this recess being elliptical in cross-section, as clearly shown in Figure 3. To provide for a proper elliptical formation of said recess, an annularly tapered lip 14 is formed on the outer casing 5, extending inwardly from the opening 12.

In the annular recess 13 of the outer casing 5 is provided an inflatable inner casing 15 conformably formed to fit tightly in the recess, this being correspondingly elliptical in cross-section. This may, within the spirit of the invention, be molded in the outer casing 5 during the manufacture of the tire, and may be retained in an inflated condition by any suitable means desired.

A tire constructed as described is mountable upon the hub 9, which is of special formation to accommodate the tire. This is formed with an inner retaining flange 16 behind which the inner wall 7 of the tire is retained. The flange 16 is mounted upon a disc 17, and from the inner wall of the disc 17 to the opening 12 of the outer casing 5 is extended a body portion 18 which is curvingly and inwardly tapered so as to present an outer surface conformably shaped relative to the lip 14 and inner casing 15 of the tire. A circular ovally shaped retaining hub cap 19 is connectable to the tapered end of the body portion 18, the hub cap 19 fitting within the concave recess 11 of the outer casing 5. Thus, the tire is effectively retained on its hub, and additionally, the retaining hub cap 19, being of oval shape in cross-section, completes the global outline of the tire.

Since this application is limited to the construction of a global wheel as described above, it is not intended herein to go into details as to the manner in which the wheel is to be operatively connected to a drive means, and mounted upon a vehicle or machine, for the purpose of imparting its forward and rearward rotatable movement, and its controlled lateral roll. It is considered sufficient herein to state that the opposed twin hubs 9 are mounted in spaced relation, each being attached to opposite sides of a spindle head 20, which can carry a drive shaft 21 and cone sleeves 22, the drive shaft and control means used in association with the cone sleeves 22 cooperating to impart both forward rotation and rolling movement to the wheel.

By reason of the construction of a wheel as described herein and illustrated in the drawing, it may be noted that spindles mounted on the spindle head 20, and extended in coaxial alignment into each of the twin hubs 9 will serve as an axle, on which the wheel may rotate forwardly or rearwardly. When used in this manner, the axis of rotation is defined by a line drawn between the center points of the openings 12 of each of the twin semi-spherical tires, and extending transversely through the drive shaft 21. The wheel can thus be used in the conventional manner. Concurrently with said forward and rearward rotation, however, when said axis is caused to depart, by a suitable control means, from a line parallel to the surface on which the wheel is rotating, and is caused to be inclined angularly to said surface, with one cap 19 positioned below the normal axis of rotation, and the other positioned above the normal axis of rotation, it is seen that the wheel will roll on tread portions of the opposed semi-spherical tires that I have indicated by the reference character 23 in Figure 1. The particular tread portions 23 on which the wheel will roll will be determined, of course, by the direction in which the axis of rotation is tilted. As an example, and referring to Figure 1, should the axis of rotation be tiltably controlled so as to lower the hub cap 19 appearing on the left in Figure 1, the tread portion 23 of the left tire will present itself to the surface on which the wheel is rotating, this in effect reducing the circumference of the wheel. However, no undue strain is placed on the tire, by reason of its particular semi-spherical formation, and in such instances, as when the vehicle is negotiating a curve, the tire assumes the strain without the damage resulting in the use of tires of conventional formation.

The above provides only one example of how the wheel described herein may be operated. Additionally, it is to be noted that the wheel can be used as a pulley wheel, and in such use can be controlled as described above so as to roll to one side or another as desired. By suitable mechanization and operative connection of the wheel to a drive means, the rolling thereof can be used to increase or decrease speed under controllable means.

What is claimed is:

1. A wheel global in form, comprising connected hubs, each hub including a body portion extended taperingly in a direction away from the other hub, and inflatable tires mounted on the hubs, each tire being substantially semi-spherical in outer conformation, and being interiorly formed conformably to the tapered surface of the body portion of the hub on which it is mounted.

2. A wheel global in form, comprising connected spaced apart hubs, each hub including a body portion extended taperingly in a direction away from the body portion of the opposed hub, inflatable tires, semi-spherical in outer conformation, and taperingly formed as to their inner conformation, mountable upon the respective body portions, and means for mounting the tires on the hubs.

CHARLES Y. JONES.

REFERENCES CITED

The following references are of record in the file of this patent:

UNITED STATES PATENTS

| Number | Name | Date |
|---|---|---|
| 2,330,958 | Danforth | Oct. 5, 1943 |

FOREIGN PATENTS

| Number | Country | Date |
|---|---|---|
| 663,565 | Germany | Aug. 11, 1938 |